(12) United States Patent
Castello et al.

(10) Patent No.: US 7,649,689 B2
(45) Date of Patent: Jan. 19, 2010

(54) APPARATUS AND METHOD FOR VIEWING MULTIPLE UNDERLYING INDICIA

(75) Inventors: Rod Castello, Studio City, CA (US); James D. Richwine, Santa Monica, CA (US); Rebecca Murray, Topanga, CA (US)

(73) Assignee: Structural Graphics, LLC, Essex, CT (US)

( * ) Notice: Subject to any disclaimer, the term of this patent is extended or adjusted under 35 U.S.C. 154(b) by 0 days.

(21) Appl. No.: 11/510,488

(22) Filed: Aug. 28, 2006

(65) Prior Publication Data

US 2008/0062527 A1    Mar. 13, 2008

(51) Int. Cl.
*G02B 27/10* (2006.01)

(52) U.S. Cl. .................. 359/619; 359/620; 359/621

(58) Field of Classification Search ................. 359/619, 359/620, 621, 627, 630, 628, 629
See application file for complete search history.

(56) References Cited

U.S. PATENT DOCUMENTS

| 4,034,555 A | * | 7/1977 | Rosenthal | .................. 368/232 |
| 5,695,346 A | * | 12/1997 | Sekiguchi et al. | ........... 434/365 |
| 2006/0056033 A1 | * | 3/2006 | Rosenthal | .................. 359/619 |

* cited by examiner

*Primary Examiner*—Joseph Martinez
*Assistant Examiner*—Brandi N Thomas
(74) *Attorney, Agent, or Firm*—Melvin I. Stoltz

(57) ABSTRACT

A promotional or novelty piece wherein a printed planar surface is provided with a translucent lenticular surface, placed in registration with a second planar surface with predetermined indicia applied so as to underlie and register with said translucent surface. The angle of the viewer's eye with said translucent surface allows said underlying indicia and secondary interlaced indicia having been applied to the underside of said lenticular lens, to be selectively and individually observed.

11 Claims, 2 Drawing Sheets

APPARATUS AND METHOD FOR VIEWING MULTIPLE UNDERLYING INDICIA

DESCRIPTION OF THE PRIOR ART

Novelty pieces utilizing lenticular lenses and multiple interlaced art to create movement or a 3 dimensional view are well known as a low cost prize or trade stimulator in the prior art. Additionally, they may be found in direct mail, merchandising and advertising pieces. In the prior art, mass mailings soliciting credit card business have contained a sample card with the addressee's name imprinted on same. This type of promotional piece is relatively expensive to produce. The present invention provides the same, if not improved, impact by utilizing a generic card and printing the addressee's name on secondary underlying indicia, which could be conventionally printed on paper or similar stock, or printed in a personalized manner using contemporary printing technology on the same stock.

SUMMARY OF THE INVENTION

It is an object of this invention to provide a novelty piece which has a changeable display, where upon viewing it at one angle a generic message or graphic is displayed and viewing it at a second angle allows a message or graphic printed on an underlying surface to be displayed.

It is another object of this invention to provide a method for providing a novelty or promotional piece that can be specifically directed to the recipient in a personal manner at a far lower cost than has been previously available.

These and other objects are accomplished by providing a novelty piece with a top surface having a translucent lenticular lens portion and a second surface having a personalized or unique message or graphic, which underlies said translucent portion. Additionally, a generic message or graphic can be applied to the underside of the top surface in an interlaced manner corresponding to the lenticular lens.

The forestated construction will function whereby when changing the angle of view, the subtended view will change between the personalized message and the generic message or graphic.

BRIEF DESCRIPTION OF PREFERED EMBODIMENT

Figure 1:
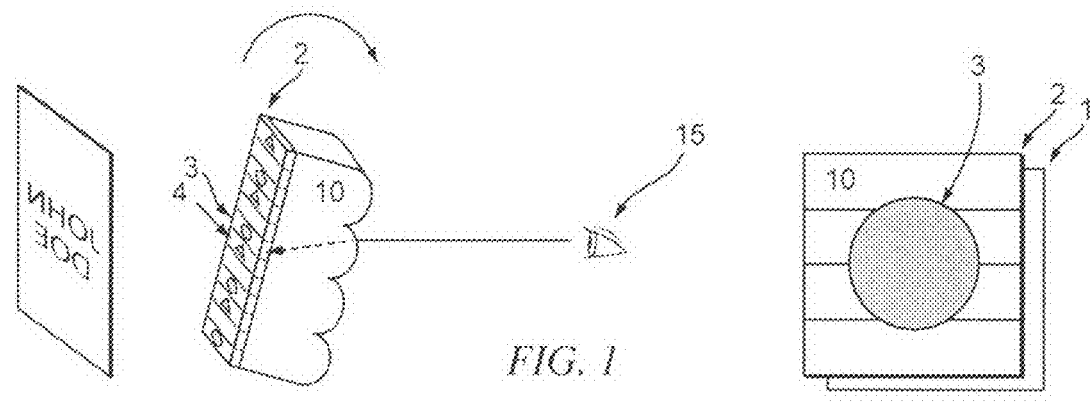
FIG. 1 is a diagram depicting a viewer observing a generic interlaced graphic applied to the underside of a lenticular lens.

Referring now to FIG. 1 of the drawing, a viewer 15 is looking at the translucent, lenticular portion 10 of the first or top planar element 2. At the subtended angle of view shown here, the viewer only sees the indicia 3 that has been applied to the backside of the lenticular portion 10 in an interlaced manner so as to produce this result. Alternatively, the lenticular portion could be bonded over the indicia rather than applying same to the underside of the lenticular portion.

Figure 2:
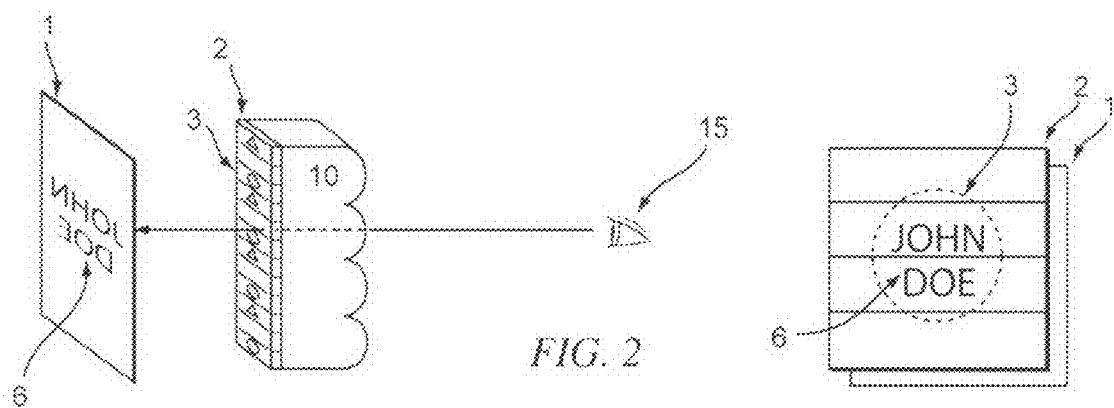
FIG. 2 is a diagram depicting a viewer observing a message underlying the lenticular lens.

In FIG. 2 the viewer 15 is viewing the lenticular portion 10 from a different angle of view, here shown as perpendicular, which permits the indicia 6, applied to planar element 1 to be exclusively viewed.

Figure 3:
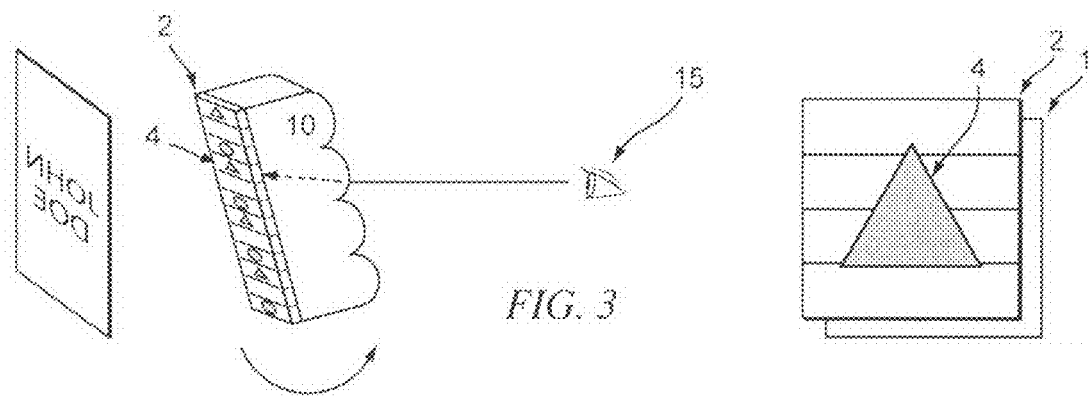
FIG. 3 is a diagram similar to that of FIG. 1 but here depicting the viewer looking upward at the interlaced segment of a generic graphic.

In FIG. 3, an additional viewing angle is shown which can be utilized to also display additional underlying indicia 6, or as in this example, additional interlaced indicia segments 4 applied to the backside of the lenticular portion 10.

In the event that the viewing of additional personalized indicia or generic options are desired, it would be well within the scope of the present invention to provide a lenticular viewing portion with additional or less interlaced sections, so as to provide the capability of viewing a selective number of generic and personalized indicia.

It is contemplated that the material utilized to fabricate the within novelty or merchandising device will be any conventional planar material such as plastic or paper.

Figure 4:
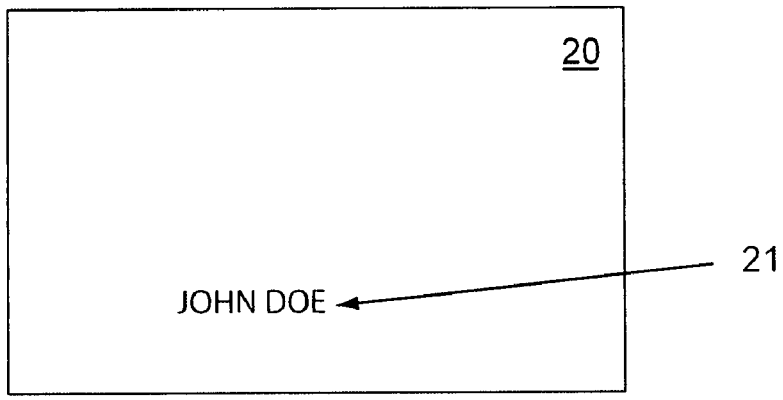
FIG. 4 is a plan view of a second planar sheet according to an embodiment of the invention.
Figure 5:
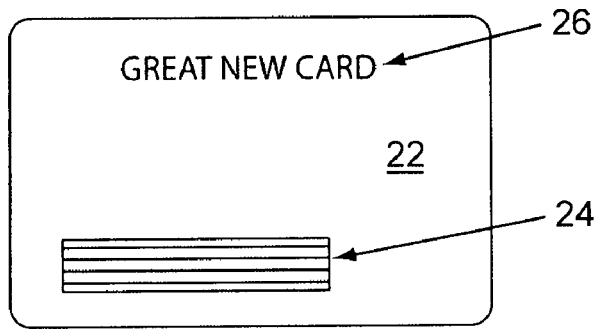
FIG. 5 is a plan view of a first planar sheet according to an embodiment off the invention.

The construction of a particular promotional piece is shown if FIGS. 4-7. In FIG. 4, there is a second planar piece 20 printed with personalized indicia 21. FIG. 5 shows a first planar piece in the form of a mock credit card 22 with a lenticular lens 24 disposed therein and generic indicia 26.

Figure 6:
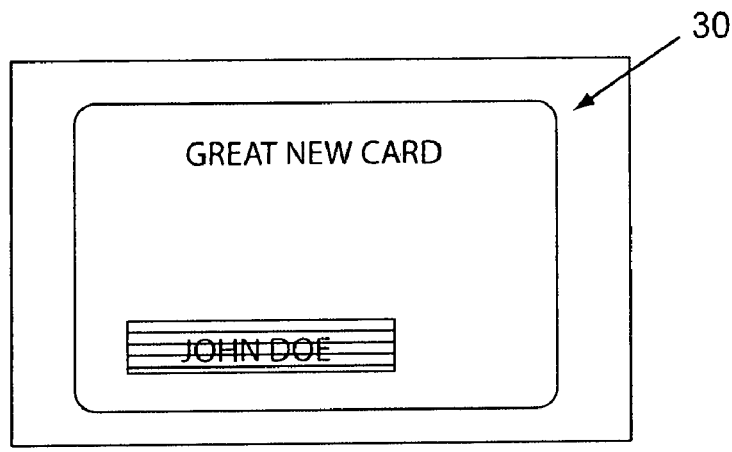
FIG. 6 is a plan view promotional piece formed from the first planar sheet of FIG. 5 affixed to the second planar sheet of FIG. 4.
Figure 7:
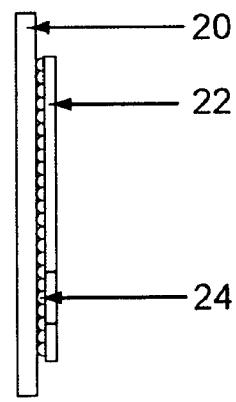
FIG. 7 is an enlarged side view of the promotional piece of FIG. 6.

When the first planar piece 20 is affixed to the second planar piece 22, as shown in FIGS. 6 and 7, a promotional piece 30 is formed, with the lenticular lens 24 placed in registration over of the personalized indicia 21, so that the personalized indicia 21 can be seen through the lens 24 at specific viewing angles, as can be seen in FIGS. 1-3. At other viewing angles, generic indicia shown in FIGS. 1-3 will be seen.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

The invention claimed is:

1. A merchandising or promotional piece comprising:
    A. a first planar member having a front side and a rear side and comprising generic indicia formed on the front side;
    B. a translucent, lenticular lens member mounted to the first planar member and forming a portion thereof with said first planar member extending beyond the terminating edges of the lenticular lens;
    C. a second planar member having a front side and a backside, with the front side affixed to the backside of the first planar member and comprising customized, personalized indicia;
    D. first indicia formed on the first planar member and positioned in cooperating association with the lenticular lens member;

E. second indicia affixed to the front side of the second planar member;

F. third indicia formed on the first planar member and positioned in cooperating association with the lenticular lens; and G. a transparent zone formed on the first planar member, interlaced with the first indicia and the third indicia, and positioned in cooperating association with the lenticular lens member for enabling a viewer, observing the merchandising or promotional piece from the front side of the first planar member and through the lenticular lens member, to observe one selected from the group consisting of a first distinct images, a second distinct image, and a third distinct image depending on the angle of view, said first distinct image being the first indicia formed on the first planar member, the second distinct image being the second indicia formed on the second planar member as viewed through the transparent zone of the first planar member, and the third distinct image being the third indicia formed on the first planar member.

2. The merchandising or promotional piece of claim 1, wherein the second planar member comprises paper-based stock.

3. The merchandising or promotional piece of claim 1, wherein the second planar member comprises plastic-based stock.

4. The merchandising or promotional piece of claim 1, wherein the first indicia is a generic indicia.

5. The merchandising or promotional piece of claim 1, wherein the second indicia is customized for a specific recipient.

6. The merchandising or promotion piece of claim 1, which is a simulated credit card, wherein the first indicia is a generic indicia, and the second indicia is a personalized indicia corresponding to the name of a recipient.

7. The merchandising or promotional piece defined in claim 1, wherein the first planar member and the translucent, lenticular lens member comprises separate and independent components which are mounted to each other.

8. The merchandising or promotional piece defined in claim 7, wherein said first planar member and said translucent, lenticular lens member are integrally mounted to each other.

9. The merchandising or promotional piece defined in claim 1, wherein the first planar member comprises a plurality of separate interlaced zones alternately formed by the first indicia, the third indicia, and the transparent zones, cooperatively associated with the translucent, lenticular lens member.

10. The merchandising or promotional piece defined in claim 1, wherein a plurality of second planar members are formed with each member comprising unique, individual, personalized indicia formed thereon as the second indicia.

11. merchandising or promotional piece defined in claim 10, wherein each second planar member is quickly and easily affixed to the first planar member for enabling a plurality of unique, distinct, personalized merchandising/promotional pieces to be easily produced with each piece having unique, personalized indicia formed thereon.

\* \* \* \* \*